United States Patent [19]

Adams et al.

[11] Patent Number: 4,964,468
[45] Date of Patent: Oct. 23, 1990

[54] METHOD OF INHIBITING CORROSION

[75] Inventors: William L. Adams; Gary R. Chesnut, both of Houston, Tex.

[73] Assignee: Nalco Chemical Company, Naperville, Ill.

[21] Appl. No.: 390,755

[22] Filed: Aug. 8, 1989

[51] Int. Cl.$^5$ .............................................. E21B 41/02
[52] U.S. Cl. ................................. 166/310; 166/371; 166/902; 252/8.555
[58] Field of Search ............... 166/267, 279, 310, 312, 166/371, 902; 252/8.555

[56] References Cited

U.S. PATENT DOCUMENTS

| | | | |
|---|---|---|---|
| Re. 28,644 | 12/1975 | Horton et al. | 166/310 X |
| 2,640,029 | 5/1951 | Blair et al. | 252/8.55 |
| 2,925,781 | 2/1960 | Fischer | 166/310 X |
| 3,033,784 | 5/1962 | Jones | 166/902 X |
| 3,105,050 | 9/1963 | Fischer | 106/902 X |
| 3,488,294 | 1/1970 | Annand et al. | 252/391 |
| 3,712,862 | 1/1973 | Bundrant et al. | 166/310 X |
| 4,086,181 | 4/1978 | Suen et al. | 252/8.555 X |
| 4,235,838 | 11/1980 | Redmore et al. | 422/7 |
| 4,326,984 | 4/1982 | Blair, Jr. | 252/8.555 |
| 4,332,799 | 6/1982 | Quinlan | 424/246 |
| 4,354,553 | 10/1982 | Hensley | 166/310 |
| 4,388,213 | 6/1983 | Oppenlaender et al. | 252/8.555 X |
| 4,446,056 | 5/1984 | Thompson | 252/391 |
| 4,631,138 | 12/1986 | Johns et al. | 252/8.555 |
| 4,635,723 | 1/1987 | Spivey | 166/250 |

OTHER PUBLICATIONS

Nace, Corrosion 87, Paper No. 40, "Parameters Relating Corrosion Inhibitor Treatment Methods and Treatment Life Times", Mar. 1987, J. A. Dougherty.

Nace et al., Asian Insp. Repair & Maintenance for the Offshore and Mar. Ind. Conf., 1986, pp. 33-35, "Downhole Corrosion Inhibition in Bass Strait", Hancock.

Nace, Corrosion 84, Paper No. 285, Apr. 1984, "Corrosion Control by Inhibitors in Producing Oil Wells in Carbon Dioxide Flooded Fields", R. L. Martin.

Drill Bit., vol. 32, No. 9, 1983, pp. 29, 31, "System Soothes Downhole Indigestion", Walsh.

Southwest Petroleum Short Course Assoc., 1983, "Batch Treatment of Sucker Rod Pumped Wells", S. Evans and C. R. Doran.

*Primary Examiner*—George A. Suchfield
*Attorney, Agent, or Firm*—Joan I. Norek; Robert A. Miller; Donald G. Epple

[57] ABSTRACT

Corrosion inhibition composition formed as a water-external emulsions having an oil soluble organic film forming type of corrosion inhibitor in the dispersed phase thereof are disclosed for downhole well applications, such emulsions having a stability at room temperature without agitation of from 2 to 30 minutes.

12 Claims, No Drawings

METHOD OF INHIBITING CORROSION

TECHNICAL FIELD OF THE INVENTION

The present invention is in the technical field of corrosion inhibition in oil and gas well facilities, and in particular the present invention is highly advantageous in the technical field of downhole corrosion inhibition.

BACKGROUND OF THE INVENTION

Downhole corrosion inhibition is extremely important in the production of oil and gas. Produced fluids are generally a mixture of liquid petroleum, natural gas, and formation water, and generally further include one or more corrodents, such as hydrogen sulfide, carbon dioxide, dissolved oxygen, and the like. Corrosion inhibitors employed for downhole applications are generally organic film formers that act by filming the downhole metal surfaces and persist as a film at least some period of time after the inhibitor feed is discontinued. Such a persistent film-forming corrosion inhibitor is commonly introduced downhole by using a treating truck to pump the inhibitor down the tubing or into the annulus of the well, followed by an overflush of fluid, which flushing fluid is generally produced water.

Such film-forming organic corrosion inhibitors are useful in producing wells where the fluid in contact with the metal surfaces to be protected is generally a mixture of hydrocarbons, usually crude oil, and brine, with the hydrocarbons constituting at least a significant, if not predominant, phase of the fluid. The corrosion inhibitors generally film the metal surfaces from the hydrocarbon or oil phase and hence the corrosion inhibitor should generally be oil soluble and only water dispersible. The persistent nature desired in the films of such inhibitors permit intermittent applications of such inhibitors in oil or gas wells, such as the truck treatment mentioned above, or periodic batch treatments, or other treatments where the inhibitor is not applied on a continuous basis. Intermittent treatments of persistent corrosion inhibitors generally employ less inhibitor than, for instance, continuous treatment of water soluble or dispersible inhibitors commonly used in wells having water as the predominant phase, for instance injection water wells.

Such oil soluble, water dispersable organic film forming corrosion inhibitors are conventionally commercially supplied as a composition containing the corrosion inhibitor actives, that is the agent(s) providing corrosion inhibition activity, a surfactant, and a solvent. The surfactant is used to disperse the corrosion inhibitor in the brine so that it migrates down the hole to the site of use. The solvent often used is a mixture of aromatic hydrocarbons, which are both relatively expensive and require special handling techniques when the composition is being shipped. The expense of the surfactant, the solvent, and the special handling requirements all contribute to the expense of a corrosion inhibition program.

It is desirable to provide a corrosion inhibitor composition that provides not only advantageous film persistency but also advantageously effective filming from the production fluid onto the metal surfaces. It is desirable to provide a corrosion inhibitor that provides a high degree of downhole corrosion inhibition. It is desirable to provide a corrosion inhibitor that reduces the oil/water handling problems in the application of the corrosion inhibitor. It is desirable to provide a corrosion inhibitor that requires a lesser volume of flushing fluid. It is desirable to provide a corrosion inhibitor composition that is more efficiently carried to the downhole site of use. These and other advantages are provided by the present invention as disclosed and discussed in more detail below.

DISCLOSURE OF THE INVENTION

The present invention provides a corrosion inhibitor composition, and method of making a corrosion inhibitor composition, and corrosion inhibition process employing a corrosion inhibitor composition, the corrosion inhibitor composition being a water-external emulsion containing the corrosion inhibitor actives in the dispersed phase, and characterized in that the surfactant (surface active agent) used to emulsify the corrosion inhibitor actives is one having an HLB (hydrophilic/hydrophobic balance) of from 10 to 17 and is employed in the amount of from 1.0 to 4.5 parts by weight per 100 parts by weight of corrosion inhibitor formulation, which formulation contains from 20 to 100 weight percent corrosion inhibitor actives, as described further below.

In preferred embodiment the corrosion inhibitor composition contains from 1 to 35 weight percent corrosion inhibitor formulation.

Such water-external emulsion, with a low level of surfactant, which is described in more detail below, has been found to more effectively film onto metal surfaces from the production fluid than conventionally employed corrosion inhibitors. It has advantageous film persistency and provides a high degree of downhole corrosion inhibition. In the preferred method of employing such corrosion inhibitor composition, oil/water handling problems are reduced. The corrosion inhibitor composition of the present invention is more efficiently carried to the downhole site of use, and it requires less flushing fluid to so carry it downhole. The corrosion inhibitor composition advantageously requires a very minor amount of surfactant. These and other advantages of the corrosion inhibitor composition, method of preparing the corrosion inhibitor composition, and process of inhibiting corrosion of metals utilizing the corrosion inhibitor are discussed in more detail below.

PREFERRED EMBODIMENTS OF THE INVENTION

The surfactant is employed to temporarily emulsify the corrosion inhibitor formulation in the aqueous medium. Although in the broadest sense of the present invention the amount of the surfactant used may range from about 1.0 to 4.5 parts by weight per hundred parts by weight of corrosion inhibitor formulation, in preferred embodiment the amount of the surfactant is from 1.0 to 3.5 parts by weight per hundred parts by weight of corrosion inhibitor formulation, greater amounts thereof not being suitable for conditions normally encountered. For instance, if the water medium being used to form the emulsion is a high NaCl brine, for instance a 25% NaCl brine, or more than 250,000 total dissolved solids ("TDS"), an appropriate amount of surfactant will be on the order of 4 parts by weight per hundred parts by weight of corrosion inhibitor formulation. Under conditions normally encountered, the water used to form the emulsion would be no stronger than about 25% NaCl brine, and would have a TDS of no greater than 250,000 ppm, and the amount of surfactant to be used would not exceed 3.5 parts by weight, and preferably from 1.5 to 3.0 parts by weight, both per hundred parts by weight of the corrosion inhibitor formulation. Such limitation as to the maximum amount of surfactant is necessary to achieve the temporary nature of the emulsion which is discussed further below.

The surfactant is one having an HLB of from 10 to 17, and preferably an HLB of from 14 to 17. Such surfactants include, but are not limited to, sorbitan fatty esters, ethoxylated fatty alcohols, ethoxylated fatty acids, and further include more specifically certain of ICI's sorbitan fatty esters sold under the tradename of Tween, such as Tween 20 with an HLB of 16.7, Tween 40 with an HLB of 15.6, and Tween 60 with an HLB of 14.9, and other commercially available surfactants such as ICI's Brij 35, a polyoxyethyl lauryl ether with an HLB of 16.9.

Within the preferred use level range of the surfactant, that is 1.0 to 3.5, or more preferred 1.5 to 3.0, parts by weight per hundred parts by weight of corrosion inhibitor formulation, it is preferred to use a higher level of surfactant, for instance 2.2 to 3.0 parts, same basis, for high fluid level conditions and conversely a lower level of surfactant for low fluid level conditions. By fluid level conditions here is meant the level or volume of fluids in the well annulus above the pump.

The corrosion inhibitor actives used may be selected from any of the oil soluble film-forming organic corrosion inhibitors, which generally include, but are not limited to, organic polar and hetero polar compounds containing N, O, S and/or other elements in Group V and VI of the periodic table, which include amines, amides, imidazolines, mercaptans, heterocylic nitrogen compounds, ureas, thioureas, phosphates, polyphosphates, oxyalkylates dimer-trimer acids, and the like. The corrosion inhibitor formulation may be 100 percent corrosion inhibitor actives, for instance where the actives are liquid, or the formulation may be a concentrate containing both the corrosion inhibitor actives and a suitable organic diluent. In the broadest sense of the invention the corrosion inhibitor formulation contains from 20 to 100 weight percent corrosion inhibitor actives, and preferably from 50 to 100 weight percent corrosion inhibitor actives. One object of the present invention is to reduce the expense of corrosion inhibition treatment, and most corrosion inhibitor actives would be useable either per se (100 percent actives) or as a concentrate having from about 65 to 90 weight percent actives. Thus in more preferred embodiment the corrosion inhibitor formulation is one having from 65 to 100 weight percent corrosion inhibitor actives.

Suitable organic diluents or solvents for use in the corrosion inhibitor formulation include methanol, isopropyl alcohol, and isobutyl alcohol, with the isopropyl and isobutyl alcohols being preferred. Other diluents or solvents may be used, for instance crude oil or aromatic hydrocarbons, but as mentioned above aromatic hydrocarbons are expensive and for use in the present invention aromatic hydrocarbons provide no advantages in comparison to the less expensive solvents. Hence one advantage of the present invention is that one does not have to use aromatic hydrocarbons to achieve desired results.

The corrosion inhibitor formulation is preferably incorporated into the corrosion inhibitor composition, that is the water external emulsion, in an amount of from 1 to 35 weight percent based on total weight of the composition, and more preferably from 5 to 30 weight percent same basis. The lower levels of such ranges is generally dictated by the practicalities of the composition's use, wherein an unnecessarily low concentration unnecessarily increases the cost of the inhibition treatment, while the upper levels of such ranges is generally dictated by handling convenience and the upper limit of corrosion inhibitor concentrate that can be suitably emulsified in the water medium.

The water medium of the water external (continuous) phase of the corrosion inhibitor composition may be tap water, or other potable or fresh water, or it may be water of far less purity, in particular produced water. Produced water, when available, is often used as the flushing fluid for the introduction of downhole corrosion inhibitors, and the advantage thereof is its availability and the desirability of a useful method of employing the water that is produced together with the produced hydrocarbons. In the present invention such produced water may be used both in the on-site preparation of the corrosion inhibitor composition and as an overflush for the introduction of the composition into the well. Produced water often has a significant amount of dissolved NaCl, and typical amounts of sodium chloride range from about 5 to 20 weight percent NaCl. For that reason, produced water or synthetic produced water is referred to as brine. Produced water generally has a TDS of 250,000 ppm or less. As mentioned above, when the water medium has a NaCl content of greater than 25 weight percent and/or a TDS of more than 250,000 ppm, the amount of surfactant included in the corrosion inhibitor is greater than the maximum of the preferred range. The produced water may also contain crude oil, which generally is of a sufficiently low level that its presence in the water phase of the corrosion inhibitor composition does not interfere with the performance of the present invention. It is believed that if a water medium contains 5,000 mg/l. crude oil, it should not be used in preparing the corrosion inhibitor composition of the present invention. Further the corrosion inhibitor composition may be prepared using a water medium that is at an elevated temperature, for instance a temperature of about 110° F. which may be encountered when using produced water.

In preferred embodiment when preparing the corrosion inhibitor composition of the present invention the water medium being used is admixed with a premixed combination of the corrosion inhibitor formulation (corrosion inhibitor actives and diluent, if any) and the surfactant.

In preferred embodiment, the corrosion inhibitor composition of the present invention is prepared by combining the water medium and the corrosion inhibitor formulation, the surfactant being present in one or the other component or added as a third component, in a homogenizer or colloid mixer, that is where the emulsifying action is provided by the incoming water medium and corrosion inhibitor formulation are forced through the holes between the concentric ring and impeller ring of such devices, rather than admixing by the shearing action of a rotary-blade type blender. In such preferred embodiment it remains preferred to premix the surfactant with the corrosion inhibitor formulation before combining the water medium and corrosion inhibitor formulation to form the water external emulsion comprising the corrosion inhibitor composition of the present invention. In further preferred embodiment the corrosion inhibitor composition is formed by a once through action of such homogenizer or colloid mixer as opposed to any recirculation.

The homogenizer or colloid mixer action is generally more efficient than a rotary-blade type mixer, providing smaller particle size dispersed phases, which is believed necessary to form an emulsion given the low level of surfactant employed in the corrosion inhibitor composition of the present invention. A less efficient action, for instance that provided generally by rotary-blade blenders, will not emulsify the components of the corrosion inhibitor composition of the present invention. The present invention does not, however, exclude other means for admixing the components if such means will form an emulsion of the components as the emulsion is described in more detail below.

The emulsion state of the corrosion inhibitor composition is a partial or temporary state. The emulsion should be stable, as defined below, for a time duration of from 2 to 30 minutes when left standing, without agitation, at room temperature. By stable is meant herein that no more than 50 percent by volume of the corrosion inhibitor formulation has separated from the water phase of the corrosion inhibitor composition. This stability should endure at least 2 minutes and no more than 30 minutes under the conditions described above.

The corrosion inhibitor composition should be in its emulsion state when introduced into the annulus or down the tubing of a well, and in preferred embodiment the corrosion inhibitor composition is under agitation just prior to such introduction into the well. Given the temporary nature of the emulsion state, it is preferred to emulsify the water medium and the corrosion inhibitor formulation at the site of the well to be treated, for instance using a treating truck equipped with a suitable homogenizer or colloid mixer and conduit for introducing the corrosion inhibitor composition into the well immediately, or a short time, after the formation of the emulsion. Such on-site preparation of the corrosion inhibitor composition permits the use of production water as the water medium, avoids the shipment of the corrosion inhibitor composition in totality, and since the use form of the corrosion inhibitor composition is a water-external emulsion an on-site preparation in a treating truck provides a material more easily handled than conventional corrosion inhibition treatments.

The corrosion inhibitor composition of the present invention may be introduced into the annulus or down the tubing of a well followed by flushing fluid, which flushing fluid may be produced water. One further advantage of the present invention is that the corrosion inhibitor composition, in its water-external emulsion form, generally requires the use of less flushing fluid than conventional corrosion inhibition treatments, which reduces the treating costs.

Oil soluble organic film-forming corrosion inhibitors for downhole use generally act by filming onto metal surfaces from the hydrocarbons of the production fluids. An increase in the filming provides an increase in the corrosion inhibition protection provided by a treatment. In addition, a downhole corrosion inhibition treatment should not itself promote the emulsification of the water and the hydrocarbons of the production fluids. The present invention, as to these and other characteristics, is shown further in the following tests.

EXAMPLES 1 AND 2

The following test measures the effectiveness of corrosion inhibitor preparation in intermittent applications in oil and gas wells. The test indicates the capability of such a preparation to film onto metal surfaces from the production fluids of a well, and the persistency of such film with no further inhibitor dosage. Such filming and persistency characteristics are determined by the protection from corrosion provided to the metal test specimens. Each of the test specimens, which are carbon steel rods, are first suspended in a tubing column of a bench apparatus that simulates an oil well. This apparatus is comprised of a length of $\frac{1}{4}$ inch steel tubing which is centered within $\frac{3}{4}$ inch glass tubing to simulate the annular area of an oil well. A peristaltic pump is used to pump liquids out of this simulated well, and hence such liquids or fluids are pumped or produced past the test specimen. The corrosion inhibitor preparation being tested is injected into the annulus of this simulated well, and flushed, and then the well fluid (30 ml. kerosene) together with the corrosion inhibitor preparation, is pumped out of the well, and past the test specimen, using a Masterflex pump equipped with a Quick-Load pump head, the pump speed being set on one. In all test runs there was a time period delay of 10 minutes between the introduction of the inhibitor preparation (with a syringe), with the overflush, and the commencement of the pumping. The test specimens are then removed from the simulated well and mounted on a wheel or mounting board for a controlled exposure to a corrosive synthetic well fluid composition. The fluid was a mixture of 100 ml. of kerosene and 100 ml. of 5% NaCl brine, both liquids being saturated with $CO_2$. During the exposure time, which in all instances was 20 hours, the test specimens were under constant rotation at a rate of 17 rpm, and the fluid was maintained at a constant temperature of 160° F. The test specimens were each maintained in a sealed cell together with such fluid during the exposure period. After the exposure period, the test specimens were wiped dry and immersed in an inhibited HCl solution for 2 to 5 minutes, and then further cleaned with soap and steel wool, immersed in isopropyl alcohol, dried and weighed. The percent corrosion inhibition provided for each inhibitor dosage tested is determined from the weight loss of the particular specimen, i.e., its weight before and after the above test procedure, and the weight loss of a blank, that is a test specimen subjected to the same procedure without the inclusion of any corrosion inhibitor species The percent corrosion inhibition is calculated using Equation 1 as follows:

$$\% \text{ Inhibition} = \frac{Y - Z}{Y} \times 100 \qquad \text{Equation 1}$$

wherein Y is the blank's weight loss and Z is the weight loss of the specimen tested with corrosion inhibitor, both in mg. The corrosive conditions of this test are more severe than that generally encountered in the field, and hence the corrosion rates determined are higher. In all instances, including the blank, the weight loss used in Equation 1 is the average of three separate runs under the same conditions. The corrosion inhibitor preparation of Comparative Example (a) was a commercial product containing about 34 percent by weight of corrosion inhibitor actives, 1 percent by weight of a surfactant, the remainder being a solvent, and as such typifies conventional corrosion inhibitor preparations for downhole applications. The corrosion inhibitor preparations of Examples 1 and 2 were corrosion inhibitor compositions of the present invention wherein 400 ml. of corrosion inhibitor actives was admixed with 100 ml. of methanol and 6 ml. of Tween 20 and then emulsified with sufficient 5% NaCl brine using a homogenizer to provide an emulsion containing about 19 weight percent of the corrosion inhibitor actives. The corrosion inhibitor actives for all was the same amido amide type corrosion inhibitor salted with DDBSA (dodecylbenzene sulfonic acid) and a dimer/trimer acid. For Examples 1 and 2, 5 ml. of the emulsion were used for each. For Comparative Example (a), 3 ml. of the preparation were used, dispersed in 2 ml. of 5% NaCl brine. For Example 2, the 5 ml. of emulsion was dilute to 10 ml. with 5% NaCl brine. For each of the Examples and Comparative Example, the introduction of the preparation into the simulated well was followed by an overflush of 5 ml. of the 5% NaCl brine. The test results are set forth in Table I below. The use of brine dilution did not significantly diminish the protection provided in Example 2 as compared to Example 1, but a comparison between them indicates that effective treatment may be obtained with less flushing.

TABLE I

| Example or Comparative Example | Weight Loss (mg/avg. 3) | Percent Inhibition |
| --- | --- | --- |
| Comparative Ex. (a) | 41.6 | 31.7 |
| Example 1 | 2.2 | 96.7 |
| Example 2 | 3.4 | 94.9 |
| Blank | 66.4 | — |

EXAMPLE 3

The following test determines whether an additive promotes the formation of a stable emulsion between the water and oil of the produced fluids. Since such an emulsion is undesirable, a relatively short breakout time is required. For each test run 100 ml. of total fluid (oil and water at the desired ratio) is placed in a 160 ml. graduated prescription bottle. The 1 ml. of the inhibitor to be tested (or none for the blanks) is added. The test bottle and a blank are then shaken vigorously after which the bottles are left standing, without agitation, at ambient room temperature while noting the amount of standing time required for the fluid in each bottle to separate, or breakout, into clean oil and water phases to the extent of 90 percent by volume of the total fluid. The breakout time of the test bottle is adjusted by subtracting therefrom the breakout time of the blank so that the emulsion-stabilizing effect being measured is that contributed by the additive. Each test bottle, together with a blank, is then subjected to a second cycle of the test by a second vigorous shaking and a second standing period. The additive used for Comparative Example (b) is the same commercial corrosion inhibitor preparation described above for Comparative Example (a). For Example 3 the corrosion inhibitor composition used is the same described above for Example 1 and having 2.1 wt. percent surfactant based on total corrosion inhibitor formulation. For Comparative Example (c), a preparation similar to Example 2 was used wherein the surfactant level was twice the amount or about 4.2 weight percent. Since the conditions of the corrosion inhibitor compositions used for Examples 3 and Comparative Example (c) did not involve a water medium with extraordinary high NaCl or TDS content, the level of surfactant in Comparative Example (c) was not only unnecessarily high, it was undesirably high. The test results for both the first and second test cycles, in seconds, and adjusted for the blanks as described above, are set forth in Table II below.

TABLE II

| Example or Comparative Example | Breakout Time (sec.) | |
| --- | --- | --- |
|  | First Cycle | Second Cycle |
| Comparative Ex. (b) | 68 | 65 |
| Example 3 | 40 | 30 |
| Comparative Ex. (c) | 80 | 210 |

EXAMPLE 4

A corrosion inhibitor composition of the present invention prepared as described in Example 1 above was compared to two commercial preparations which differed from that described for Comparative Example (a) above in that one contained 1 wt. percent of a different surfactant and the other contained a higher 7 to 8 wt. percent surfactant level. Each was first dispersed in 10% NaCl brine and then left standing at room temperature until separation is complete. As to such dispersibility in brine, Example 4 fell midway between the commercial preparations. After separation was completed, vigorous shaking of commercial preparations resulted in a redispersion in the brine, while Example 4 was not redispersible. This test result is another measure of the corrosion inhibitor composition's filming capability. Once the oil soluble actives breakout from the water phase of the well fluids, redispersion therein is undesirable as it would diminish filming onto the metal surfaces to be protected.

EXAMPLE 5, 6 AND 7

Following the procedure described for the corrosion inhibitor composition of Example 1 above, except for the concentration of the brine, successful corrosion inhibitor compositions were prepared using 10, 15, and 20% NaCl brines as the water medium, and with 20% NaCl brine additional surfactant was required All of these emulsions were stable (defined above) for at least 2 minutes but no more than 30 minutes.

EXAMPLE 8

Following the procedure described for the corrosion inhibitor composition of Example 1 above, except for the composition of the brine, a successful corrosion inhibitor composition was prepared using a field brine which had 113 mg/1 crude oil contaminant. This emulsion was stable (defined above) for at least 2 minutes but no more than 30 minutes.

EXAMPLE 9

Following the procedure described for the corrosion inhibitor composition of Example 1 above, except for the temperature of the brine, a successful corrosion inhibitor composition was prepared using brine at an elevated temperature of 110° F. This emulsion was stable (defined above) for at least 2 minutes but no more than 30 minutes.

EXAMPLE 10

Using the filming portion of the test method described in Examples 1 and 2 above, except for the temperature of the fluids being pumped past the metal test specimen, a corrosion inhibitor composition prepared as described for Example 1 above was tested with the fluids heated to 110° F., and such elevated temperature did not effect the filming ability of the corrosion inhibitor composition.

EXAMPLE 11

The test described in Example 10 above was repeated with the fluids heated to 150° F. Such extreme elevated temperature did reduce the inhibitor film left on the metal test specimen, but the corrosion inhibitor composition of the present invention, under such extreme temperature conditions, left a more complete film than commercial corrosion inhibitor preparation described in Comparative Example (a) above.

In the above examples which employ the simulated well described in Examples 1 and 2 above, between all test runs such apparatus was cleaned with 40 ml. of a 50/50 by volume mixture of aromatic naptha and isopropanol.

As mentioned at least in part above, the present invention is useful for the treatment of oil and gas well, particularly production wells, and the present invention is particularly advantageous for the treatment of well with high fluid levels. The present invention is particularly useful for inhibiting corrosion of ferrous metals in oil and gas well drilling systems, particularly when used as a downhole corrosion inhibitor treatment.

INDUSTRIAL APPLICABILITY OF THE INVENTION

The present invention is applicable to the oil and natural gas production industries as a composition for, a method of preparing a composition for, and a process of using a composition for, downhole corrosion inhibition.

We claim:

1. A process for inhibiting corrosion in an oil or gas well comprising:
   introducing into said well a corrosion inhibitor composition comprised of
   a water external emulsion comprised of a water medium, a corrosion inhibitor formulation, and a surfactant,
   wherein said surfactant has an HLB of from about 10 to about 17 and is present in said emulsion in the amount of from about 1.0 to about 4.5 parts by weight per 100 parts by weight of said corrosion inhibitor formulation,
   wherein said corrosion inhibitor formulation is comprised of from about 20 to about 100 weight percent of at least one corrosion inhibitor compound of the oil soluble organic film forming type, the remainder of said corrosion inhibitor formulation being an organic diluent for said corrosion inhibitor compound, and
   wherein said water external emulsion is in a temporary stable state when introduced into said well, said temporary stable state being that in which upon standing without agitation at room temperature a separation of 50 percent by volume of said corrosion inhibitor formulation occurs within the time period of from 2 to 30 minutes.

2. The process of claim 1 wherein said corrosion inhibitor formulation comprises from 1 to 35 weight percent of said water external emulsion.

3. The process of claim 1 wherein said surfactant is present in the amount of from 1.0 to 3.5 parts by weight per 100 parts by weight of said corrosion inhibitor formulation.

4. The process of claim 3 wherein said surfactant is present in the amount of from 1.5 to 3.0 parts by weight per 100 parts by weight of said corrosion inhibitor formulation.

5. The process of claim 1, 3 or 4 wherein said surfactant has an HLB of from 14 to 17.

6. The process of claim 1, 3 or 4 wherein said corrosion inhibitor formulation contains from 65 to 100 weight percent of said corrosion inhibitor actives.

7. The process of claim 1 wherein said organic diluent is methanol, isopropanol, isobutanol or mixtures thereof.

8. The process of claim 1, 3 or 4 wherein said water medium is brine having a NaCl concentration of 25 percent or higher and said surfactant is present in the amount of from 3.5 to 4.5 parts by weight per 100 parts by weight of said corrosion inhibitor formulation.

9. The process of claim 1, 3 or 4 wherein said water medium contains more than 250,000 ppm of total dissolved solids and said surfactant is present in an amount of from 3.5 to 4.5 parts by weight per 100 parts by weight of said corrosion inhibitor formulation.

10. The process of claim 1, 3 or 4 further including the step of forming said water external emulsion immediately prior to introducing said corrosion inhibitor composition into said well.

11. The process of claim 1 wherein said corrosion inhibitor formulation and said surfactant are premixed prior to forming said water external emulsion with said water medium.

12. The process of claim 1 wherein said water external emulsion is formed by the emulsifying action of a homogenizer or colloid mixer upon an admixture of said water medium, said corrosion inhibitor formulation, and said surfactant.

* * * * *